(12) United States Patent
McCord

(10) Patent No.: US 11,741,484 B2
(45) Date of Patent: *Aug. 29, 2023

(54) CUSTOMER INTERACTION AND EXPERIENCE SYSTEM USING EMOTIONAL-SEMANTIC COMPUTING

(71) Applicant: Vonage Business Limited, Basingstoke (GB)

(72) Inventor: Alan McCord, Wakatipu Queenstown (NZ)

(73) Assignee: VONAGE BUSINESS LIMITED, Basingstoke (GB)

( * ) Notice: Subject to any disclaimer, the term of this patent is extended or adjusted under 35 U.S.C. 154(b) by 565 days.

This patent is subject to a terminal disclaimer.

(21) Appl. No.: 16/431,584

(22) Filed: Jun. 4, 2019

(65) Prior Publication Data

US 2020/0160356 A1 May 21, 2020

Related U.S. Application Data

(63) Continuation of application No. 16/163,482, filed on Oct. 17, 2018, now Pat. No. 10,311,454, which is a
(Continued)

(51) Int. Cl.
| | |
|---|---|
| G06F 7/00 | (2006.01) |
| G06Q 30/0201 | (2023.01) |
| G10L 25/63 | (2013.01) |
| G10L 15/22 | (2006.01) |
| G10L 15/18 | (2013.01) |
| G06N 20/00 | (2019.01) |
| G06F 16/248 | (2019.01) |
| G06F 16/9535 | (2019.01) |

(Continued)

(52) U.S. Cl.
CPC ....... *G06Q 30/0201* (2013.01); *G06F 16/248* (2019.01); *G06F 16/24578* (2019.01); *G06F 16/9535* (2019.01); *G06F 40/237* (2020.01); *G06N 20/00* (2019.01); *G10L 15/1815* (2013.01); *G10L 15/22* (2013.01); *G10L 15/26* (2013.01); *G10L 25/63* (2013.01)

(58) Field of Classification Search
CPC .............. G06F 16/248; G06F 16/9535; G06F 16/24578; G06F 40/237; G10L 15/1815; G10L 15/22; G10L 15/26; G10L 25/63; G06Q 30/0201; G06N 20/00
USPC ................................ 707/728, 738, 739, 805
See application file for complete search history.

(56) References Cited

U.S. PATENT DOCUMENTS 9,652,113 B1 * 5/2017 Colson .................... G10L 15/26
10,275,522 B1 * 4/2019 Hernandez ............ G06F 16/353
(Continued)

*Primary Examiner* — Md I Uddin
(74) *Attorney, Agent, or Firm* — Galvin Patent Law LLC; Joseph Pagnotta; Brian S. Boon

(57) ABSTRACT

A system and method for customer interaction and experience enhancement which automatically gathers direct and indirect customer communications about products and services, converts them to text where necessary, and analyzes the communications for sentiment and emotional content, and scores and displays the information in a manner conducive to making business decisions based on the customer sentiment and emotion, such as making changes to products or services, troubleshooting customer service interactions, and better marketing.

10 Claims, 16 Drawing Sheets

Related U.S. Application Data continuation-in-part of application No. 15/675,420, filed on Aug. 11, 2017, now Pat. No. 10,162,844.

(60) Provisional application No. 62/523,733, filed on Jun. 22, 2017.

(51) Int. Cl.
*G06F 16/2457* (2019.01)
*G10L 15/26* (2006.01)
*G06F 40/237* (2020.01)

(56) References Cited

U.S. PATENT DOCUMENTS

| | | | |
|---|---|---|---|
| 2017/0250931 A1* | 8/2017 | Ioannou | H04L 51/52 |
| 2019/0347571 A1* | 11/2019 | Qadir | G06K 9/6267 |

* cited by examiner

|  | D1 | D2 | D3 | D4 |
|---|---|---|---|---|
| "Seattle" | 1 | 1 | 0 | 0 |
| "Seahawks" | 1 | 1 | 0 | 0 |
| "Denver" | 0 | 0 | 1 | 0 |
| "Broncos" | 0 | 0 | 1 | 1 |

Fig. 5

|  | A | B | C | D | E | F | G | H |
|---|---|---|---|---|---|---|---|---|
| "Seattle" | 0 | 2 | 0 | 0 | 0 | 0 | 0 | 1 |
| "Seahawks" | 2 | 0 | 0 | 0 | 1 | 0 | 1 | 0 |
| "Denver" | 0 | 0 | 0 | 2 | 0 | 0 | 0 | 1 |
| "Broncos" | 0 | 0 | 2 | 0 | 1 | 0 | 1 | 0 |

Fig. 6

|  | #se | sea | eat | ett | att | ttl | tle | le# |
|---|---|---|---|---|---|---|---|---|
| "Seattle" | 1 | 1 | 0 | 1 | 0 | 1 | 1 | 1 |
| "Settle" | 1 | 0 | 1 | 0 | 1 | 0 | 1 | 1 |

CUSTOMER INTERACTION AND EXPERIENCE SYSTEM USING EMOTIONAL-SEMANTIC COMPUTING

CROSS-REFERENCE TO RELATED APPLICATIONS

| Application No. | Date Filed | Title |
|---|---|---|
| Current application | Herewith | CUSTOMER INTERACTION AND EXPERIENCE SYSTEM USING EMOTIONAL-SEMANTIC COMPUTING Is a continuation of: |
| 16/163,482 | Oct. 17, 2018 | CUSTOMER INTERACTION AND EXPERIENCE SYSTEM USING EMOTIONAL-SEMANTIC COMPUTING which is a continuation-in-part of: |
| 15/675,420 | Aug. 11, 2017 | SYSTEM AND METHODS FOR USING CONVERSATIONAL SIMILARITY FOR DIMENSION REDUCTION IN DEEP ANALYTICS which claims benefit of, and priority to: |
| 62/523,733 | Jun. 22, 2017 | SYSTEM AND METHODS FOR USING CONVERSATIONAL SIMILARITY FOR DIMENSION REDUCTION IN DEEP ANALYTICS | the entire specification of each of which is incorporated herein by reference.

BACKGROUND OF THE INVENTION

Field of the Art

The disclosure relates to the field of information processing, and more particularly to the management and enhancement of customer relationships using automated computer analysis of the sentiment and emotion contained in text-based interactions with the customer.

Discussion of the State of the Art

There is a tremendous wealth of information available online in terms of user opinions, experiences, viewpoints, and commentaries. Likewise, advances in automatic speech recognition have provided another source of textual information by allowing the conversion of voice conversations into text in near real-time. Unfortunately, this wealth of customer information is unorganized, and therefore underutilized by businesses as a form of indirect customer interaction and feedback. By posting on online platforms, writing web logs, leaving reviews on products and services, and similar activities, people can have substantial influence on the opinions of others, and are providing information that would be useful for businesses to know in developing their marketing, changing their products or services, and improving their customers' experiences with the business and its products or services. However, that information often does not make its way to the affected business, and even if it did, it currently requires a person to read it, understand the writer's emotional state and sentiment in making the online post, and make business decisions accordingly. Even in direct communications with the business through emails, live text chats, or phone calls the emotional content of the customer's communications requires human assessment, and remains underutilized in making effective business decisions.

Thus, there is a tremendous untapped potential for businesses to enhance their relationships with their customers by understanding the emotional content of their customers' direct and indirect interactions with the business. By understanding the emotional content of customers' communications with others and with the business itself about the business' products and services, the business may be able to improve its customer interactions and experiences in terms of advertising, marketing, customer service troubleshooting, call center routing and call management, and similar applications.

What is needed is a more efficient and effective way to automatically analyze and represent the emotional content of direct and indirect customer communications in order to allow businesses to take appropriate action to optimize their customer relations.

SUMMARY OF THE INVENTION

Accordingly, the inventor has conceived, and reduced to practice, a customer interaction and experience system which automatically gathers direct and indirect customer communications about products and services, converts them to text where necessary, and analyzes the communications for sentiment and emotional content, and scores and displays the information in a manner conducive to making business decisions based on the customer sentiment and emotion, such as making changes to products or services, troubleshooting customer service interactions, and better marketing.

In a preferred embodiment, the system comprises a deep web search engine, an automated speech recognition engine, a sentiment and emotion analyzer, and a scoring and display engine. The deep web search engine automatically searches the internet for indirect customer communications related to products and services of interest to the business. Such content would be drawn from a variety of sources including online reviews, social media posts, blogs, articles, and may consist of text, audio, or video. The deep web search engine sends text directly to the sentiment and emotion analyzer, and forwards audio and video to the automated speech recognition engine. Direct customer communications with the business in text form (e.g., email and live chats) are sent directly to the sentiment and emotion analyzer. Direct customer communications with the business that contain audio data (e.g., phone calls and video conferences) are sent to the automated speech recognition engine. The automated speech recognition engine converts any audio data received into text, and forward the text to the sentiment and emotion analyzer. The sentiment and emotion analyzer contains a text manager, a corpus generator, a lexicon generator, a database, a human oversight terminal, and a probability distribution engine. The text manager forwards the information both to a corpus generator and a probability distribution engine. The corpus generator parses and organizes natural language words and phrases from current and prior text-based information it has received from the text manager and stores that information as a corpus in the database. The lexicon generator accesses the corpus contained in the database and assigns vector dimensions associating words and phrases depending on their context, using label propagation machine learning algorithms. The resulting lexicon in vector form is likewise stored in the database. A human oversight terminal allows for supervision and correction of the assignment of vector information generated by the lexicon generator to ensure accuracy and to train the machine learning algorithms. Using the corpus and lexicon contained in the database, a probability distribution engine assigns probabilities of the sentiment and emotions being expressed in the current text-based information it has received from the text manager, and outputs the likely sentiment and emotional content of the current text-based information to the scoring and display engine. The scoring and display engine cumulatively assigns scores for sentiment and emotion to products and services of interest to the business based on the analysis from the sentiment and emotion analyzer, and displays the resulting information in tabular or graphical form for use by decision-makers at the business.

According to another preferred embodiment, the following method would be used for automated analysis of the sentiment and emotion contained in text-based information using vector algebra algorithms, comprising the steps of: (a) gathering indirect customer communications about products and services from online sources; (b) gathering direct customer communications about products and services; (c) converting any audio data in the customer communications to text using automated speech recognition; (d) creating a corpus of words and phrases from the gathered and converted text of direct and indirect customer communications; (e) creating a lexicon by assigning vector dimensions using machine learning algorithms to the words and phrases contained in the corpus, associating the words and phrases depending on context; (f) allowing human supervision and correction of the vector information assigned to the corpus and lexicon to ensure accuracy; (g) assigning probabilities of the sentiment and emotions being expressed in the text-based information; (h) outputting the analysis to a scoring and display engine; and (i) displaying the results of the scoring in textual, tabular, or graphical format.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 5 is an illustration of a topical similarity matrix, according to an aspect.

FIG. 6 is an illustration of a matrix showing typical similarity, according to an aspect.

FIG. 7 is an illustration of the use of character trigrams to provide a notion of information distance similar to string edit-distance measurements, according to an aspect.

DETAILED DESCRIPTION

Figure 1:
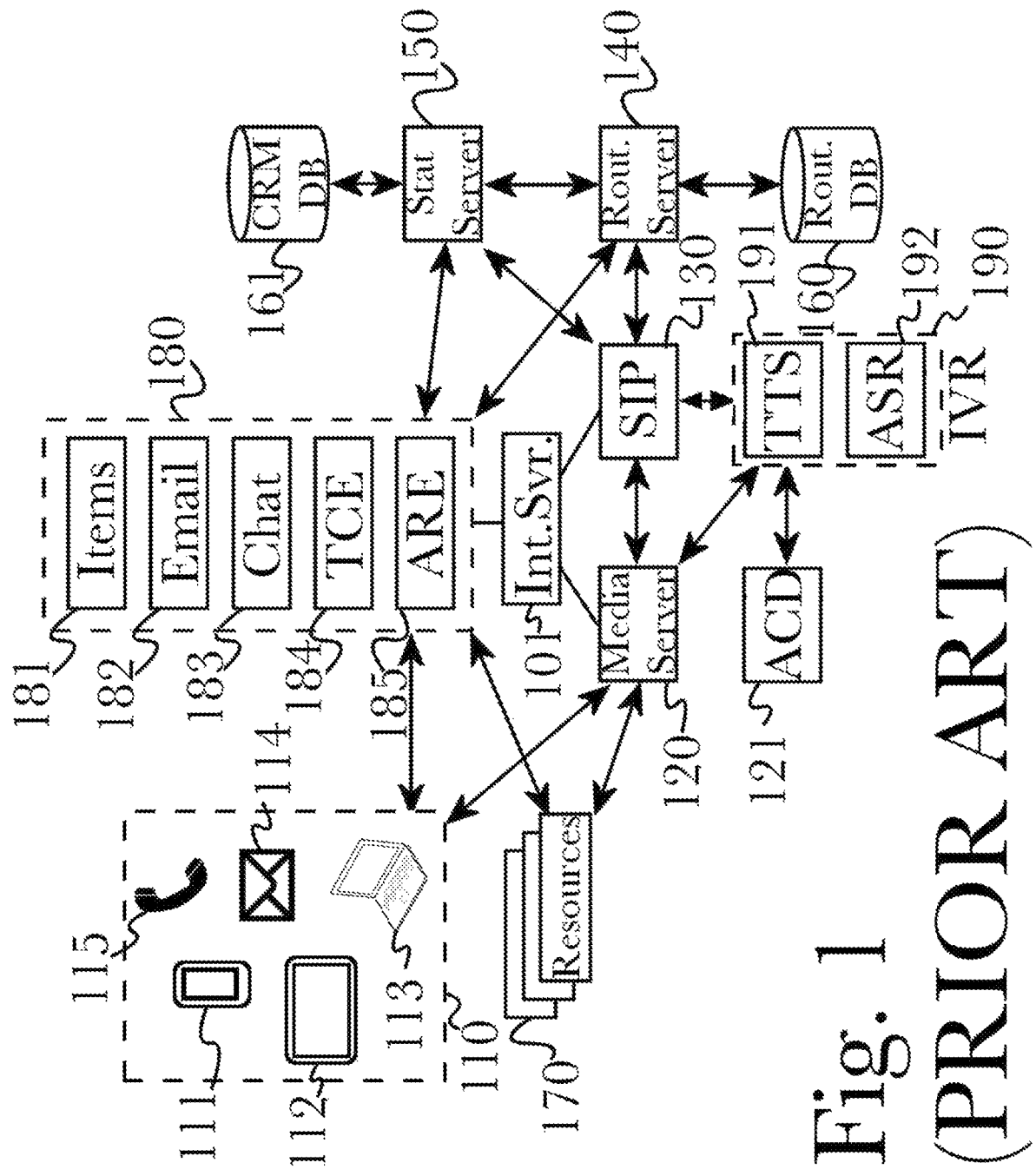
FIG. 1 (PRIOR ART) is a block diagram illustrating an exemplary system architecture for a contact center.

The inventor has conceived, and reduced to practice, a customer interaction and experience engine which automatically gathers text-based information and performs an efficient and effective analysis and representation of the sentiment and emotion contained in the information by computing and storing dense high dimensional vector embeddings (distributed representations) of words and phrases into a combined database for emotions and semantics (meaning) as a set of reusable vector building blocks.

A large volume of textual information exists online, particularly where customers express opinions about products and companies. Furthermore, advances in automatic speech recognition have provided another source of textual information by allowing the conversion of voice conversations into text in near real-time. In the case of call centers, this means that phone calls can be converted to text and analyzed for emotional content. To the extent that businesses can understand the emotional content of the customer's expressions, they can take action to optimize the business/customer relationship.

The analysis of the emotional content of text-based information can be broadly separated into two forms: sentiment analysis and emotion analysis. Sentiment analysis is the simpler of the two. It attempts to identify the writer's attitude toward a topic on a one-dimensional scale (e.g., positive, neutral, negative). Emotion analysis is more complex and difficult, as it requires a multi-dimensional analysis of the emotions the writer is expressing in the text (e.g. anger, sadness, fear, etc.). A non-exclusive list of other types of textual analysis includes: semantic analysis (the analysis of the writer's meaning and intent), topic extraction (the analysis of the overall topic of conversation in a writing), ideological analysis (placing the writer's opinion within a certain ideological classification), and quantitative analysis (how many times a certain thing is mentioned).

The research into automated emotion analysis of text-based information has primarily focused on the use of one of two primary methods of analysis: corpus-based and lexicon-based. In the corpus-based methods, a body (corpus) of words and phrases is annotated with emotion information, which is then analyzed using machine learning algorithms. This approach requires human input to initially classify the words and phrases. Corpus-based methods tend to be more accurate in identifying emotional content because the emotional tags have been created by humans, but they perform poorly in terms of identifying where emotional content should be analyzed and perform poorly when applied outside of the context for which the original corpus was tagged. In the lexicon-based methods, a dictionary is created of words and phrases labeled with emotional information, and that dictionary is used to identify the emotional content of single words and phrases. Lexicon-based methods can be initiated with small bodies of emotion-tagged words and phrases, from which additional tags are created by label propagation algorithms. They require substantially less human input, are computationally efficient, and their results can be generalized to cases outside of the context for which they were originally created. However, they perform poorly at distinguishing the emotional content of words whose emotional content relies on context. Generally speaking, corpus-based systems tend to have better overall performance in assessing emotional content contained in text-based information, but require more human input and their better performance is limited to the context for which they were originally created.

Existing text analysis systems are inefficient and often not very effective; to obtain an acceptable level of accuracy, they generally require a large body of words and phrases to be created and manually tagged with emotional information by humans. This process is slow and cumbersome, and each body of words and phrases is limited to use in the specific context or field for which it was created. Even with a large body of words and phrases, many of the approaches currently used provide less than optimal results even with a large body of words and phrases.

In an embodiment of the present system, the corpus is automatically generated from incoming words and phrases, and a label propagation algorithm creates a lexicon of emotion-enhanced word embeddings that provide associations between meaning and emotion and also expands the lexicon of word and phrase vectors that are business-domain specific. In this manner, the need for a manually-created corpus is eliminated, as the system automatically generates the corpus. The lexicon is, likewise, is automatically generated, and can be generalized to for use in new domains without the need to create specialized corpora for each domain. The associations are made in the form of vector embeddings (distributed representations) of words and phrases into a combined database for emotions and semantics (meaning) as a set of reusable vector building blocks. The system uses a combined corpus-based and lexicon-based approach which maximizes both generalizability and accuracy of emotion detection. The system automatically creates a corpus, or body of words and phrases, from incoming text, and uses label propagation algorithms to create emotion-enhanced word embeddings that provide high dimensional associations between meaning and emotion and also expands the lexicon of word and phrase vectors that are business-domain specific. The result is a comprehensive emotion classification or emotion analysis system, which is capable of assigning probability distributions to the potential sentiments and emotional content of the text. These likely sentiments and emotions can then be used for practical purposes such as determining whether customers are happy with a particular product, routing customer calls to particular customer service agents trained to handle certain emotional conditions displayed by the customer's expressions, improve certain aspects of a product, automatic correction of transcriptions, or other actions that facilitate the business' work or its relationship with its customers.

In an embodiment of the system described herein, the system is capable of automatically gathering text-based information from a multiplicity of sources on subjects of interest and computing a representation of that text that includes the emotional context of what is communicated in a way that makes it easier to interpret the sentiment, emotional state, and other meaning and to take more appropriate action. As text is received into the corpus generator, it is parsed into a collection of natural language words and phrases and stored in the database. The corpus grows to incorporate new words and phrases over time, as new text-based information is received. The accuracy of the system improves as the corpus grows larger. Using the technique of computing and storing dense high dimensional vector embeddings (distributed representations) of the words and phrases (and not just the actual words and phrases) a lexicon of emotions and semantics (meaning) is created as a set of reusable vector building blocks. The lexicon is created using label propagation machine learning algorithms, which create a graph consisting of nodes connected by edges. The nodes represent the words and phrases, and the edges connecting the nodes represent the relationship between the words and phrases. The edge weights determine the strength of the relationship between nodes, and may be defined in terms of a distance metric or in terms of cosine similarity. The lexicon is also stored in the database. Gradient descent can be used to minimize the entropy of the label assignments. Cosine similarity of edge weights can be used as a distance metric to give the algorithm the ability to discern relevant dimensions and to reduce the weight of irrelevant dimensions. Batch processing can be used to improve processing times, while retaining accuracy. For example, instead of keeping the entire vocabulary in memory during optimization, a subset of the vocabulary can be randomly selected and the corresponding sub-matrix can be computed. If a sufficient number of random sub-matrices are used for optimization, the obtained parameters will approximate those resulting from optimizing on the entire matrix. Skewed distributions of labeled and unlabeled instances can be corrected by giving them equal to the proportion that they have in the original transition probability matrix.

Another challenge is the lack of emotionally labelled text data in a particular business domain. A specific business domain may have a unique lexicon (vocabulary) relating to specific products and services and business-specific patterns of text. What is therefore needed is a method to be able to learn business-domain-specific vector embeddings from relatively small datasets. One approach is to take pre-trained word embeddings that have been trained on large general text data sets and rearrange the embeddings in their original vector space without directly having to learn an entire language model for a new business domain. The system can make use of similarities of language patterns across different business domains through relatively simple linear rotations of the vectors rather than having to build a database from scratch for each business domain.

This approach can be referred to as emotion-semantic vectorization followed by simpler vector based operations as emotion-based computing. Another advantage of this approach is that the original text does not need to be retained in the database. The vectors alone cannot be used to regenerate the original text. This assists, for example, in the compliance with the European Union General Data Protection Regulation for preserving the privacy of an individual's information and can even help identify words and phrases that are semantically close to protected phrase areas which should be redacted or replaced with a token but would otherwise be overlooked.

In some embodiments, vector clustering may be used to segment similar content. Vector clustering involves analyzing the relative distance of vectors embedded in objects to determine their similarity in the aspects associated with those vectors. Objects (for example, words or phrases) with smaller relative distances are more similar in those aspects represented by the vectors than objects with greater relative distances.

In some embodiments, linear transformation is used to translate between the languages of business-specific domains. For example, if a first vector in vector space A represents a particular characteristic of a word or phrase in a certain business domain, and a second vector in vector space B represents the same (or similar) characteristic of a word or phrase in a different business domain, a new vector space AB can be created which maps the first vector to the second, indicating that the characteristic applies to both business domains.

In some embodiments, vector algebra is used to find content needed to achieve target emotional-semantic content. Since the meanings of words and phrases are represented by vectors, algebraic manipulation of the vectors can be used to find similarities between objects (e.g., words and phrases) in those aspects represented by the vectors.

According to an aspect of an embodiment, vector calculus is used to understand and predict time evolution in emotion and meaning by calculating rates of change of vectors and time dynamics. In a similar manner to vector algebra above, vector calculus can be used to find similarities in the rate of change between objects (e.g., words and phrases) in those aspects represented by the vectors.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Corpus" as used herein means a collection of natural language words, phrases, or both. The words and phrases in the corpus may optionally by tagged with emotional information for use in performing textual analysis.

"Emotion analysis" and "Emotion classification" as used herein have the same meaning, and refer to the automatic detection of the emotions that a writer is experiencing in relation to a topic from an analysis of the text of the writing. Emotion analysis is multi-dimensional, and thus more complex and difficult, than one-dimensional sentiment analysis.

"Emotional content" as used herein means the emotions that a writer is experiencing in relation to a topic.

"Lexicon" as used herein means vector information for each word or phrase in the corpus that provides information regarding meaning, associations, relationships, sentiment, emotion, and other information useful for performing textual analysis.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Sentiment" as used herein means the writer's attitude toward a topic. The sentiment (sometimes called "polarity" or "valence") of a text is typically classified into a three-value scale (positive, neutral, negative) or a five-value scale (very positive, positive, neutral, negative, very negative).

"Sentiment analysis" as used herein means the automatic detection of a writer's attitude toward a topic from an analysis of the text of the writing. The goal of sentiment analysis is to determine the sentiment expressed by the writer of the text, or phrases, and sentences within the text.

Conceptual Architecture

FIG. 1 (PRIOR ART) is a block diagram of an exemplary system architecture for a contact center, which is contemplated as being a typical environment for application of aspects of the invention. According to the embodiment, a plurality of interaction types 110 may be received from a variety of services or devices, such as (for example, including but not limited to) a smartphone 111, tablet computing device 112, personal computer 113, email service 114, or telephone network 115. Interactions 110 may be delivered to, or initiated outward from, media server 120 or an appropriate text-based interaction handler 180, according to the specific nature of the interaction, by an interaction server 101 that operates as a central interaction handler for routing interactions appropriately based on their type or context. Text-based handlers 180 may comprise handlers for work items 181 such as internal actionable items that may not necessarily involve customer interaction directly (for example, processing a credit application, which is certainly a part of a customer interaction but is handled fully "behind the scenes"), email server 182 for handling email messages, chat server 183 for handling IP-based chat interactions, text classification engine (TCE) 184 for classifying and routing text-based interactions appropriately, and auto response engine (ARE) 185 for automatically responding to text interactions when possible (for example, for producing automated responses to simple account-related queries).

In some arrangements where a single medium (such as telephone calls) is used for interactions which require routing, media server 120 may be more specifically a private branch exchange (PBX), or an automated call distributor (ACD) 121 may be utilized, or similar media-specific switching system. Interactions may be received via an interactive voice response (IVR) 190 that may comprise text-to-speech 191 and automated speech recognition 192 elements to provide voice prompts and handle spoken input from callers. Generally, when interactions arrive at media server 120, a route request, or a variation of a route request (for example, a SIP invite message), is sent to session initiation protocol SIP server 130, or to an equivalent system such as a computer telephony integration (CTI) server. A route request may comprise a data message sent from a media-handling device such as media server 120 to a signaling system such as SIP server 130, the message comprising a request for one or more target destinations to which to send (or route, or deliver) the specific interaction with regard to which the route request was sent. SIP server 130 or its equivalent may, in some embodiments, carry out any required routing logic itself, or it may forward the route request message to routing server 140. In a preferred embodiment, routing server 140 uses historical or real time information, or both, from statistics server 150, as well as configuration information (generally available from a distributed configuration system, not shown for convenience) and information from routing database 160. Routing database 160 may comprise multiple distinct databases, either stored in one database management system or in separate database management systems, and additional databases may be utilized for specific purposes such as (for example, including but not limited to) a customer relationship management (CRM) database 161. Examples of data that may normally be found in a database 160, 161 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 170 (which may be human agents, automated software agents, interactive voice response scripts, and so forth); data extracted from third party data sources including cloud-based data sources such as CRM and other data from Salesforce.com, credit data from Experian, consumer data from data.com; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of statistics server 150, routing database 160, CRM database 161, and any associated configuration systems, routing server 140 selects a routing target from among a plurality of available resources 170, and routing server 140 then instructs SIP server 130 to route the interaction in question to the selected resource 170, and SIP server 130 in turn directs media server 120 to establish an appropriate connection between interaction 110 and target resource 170. It should be noted that interactions 110 are generally, but not necessarily, associated with human customers or users. Nevertheless, it should be understood that routing of other work or interaction types is possible, according to the present invention. For example, in some embodiments work items, such as loan applications that require processing, are extracted from a work item backlog or other source and routed by a routing server 140 to an appropriate human or automated resource to be handled.

Figure 2:
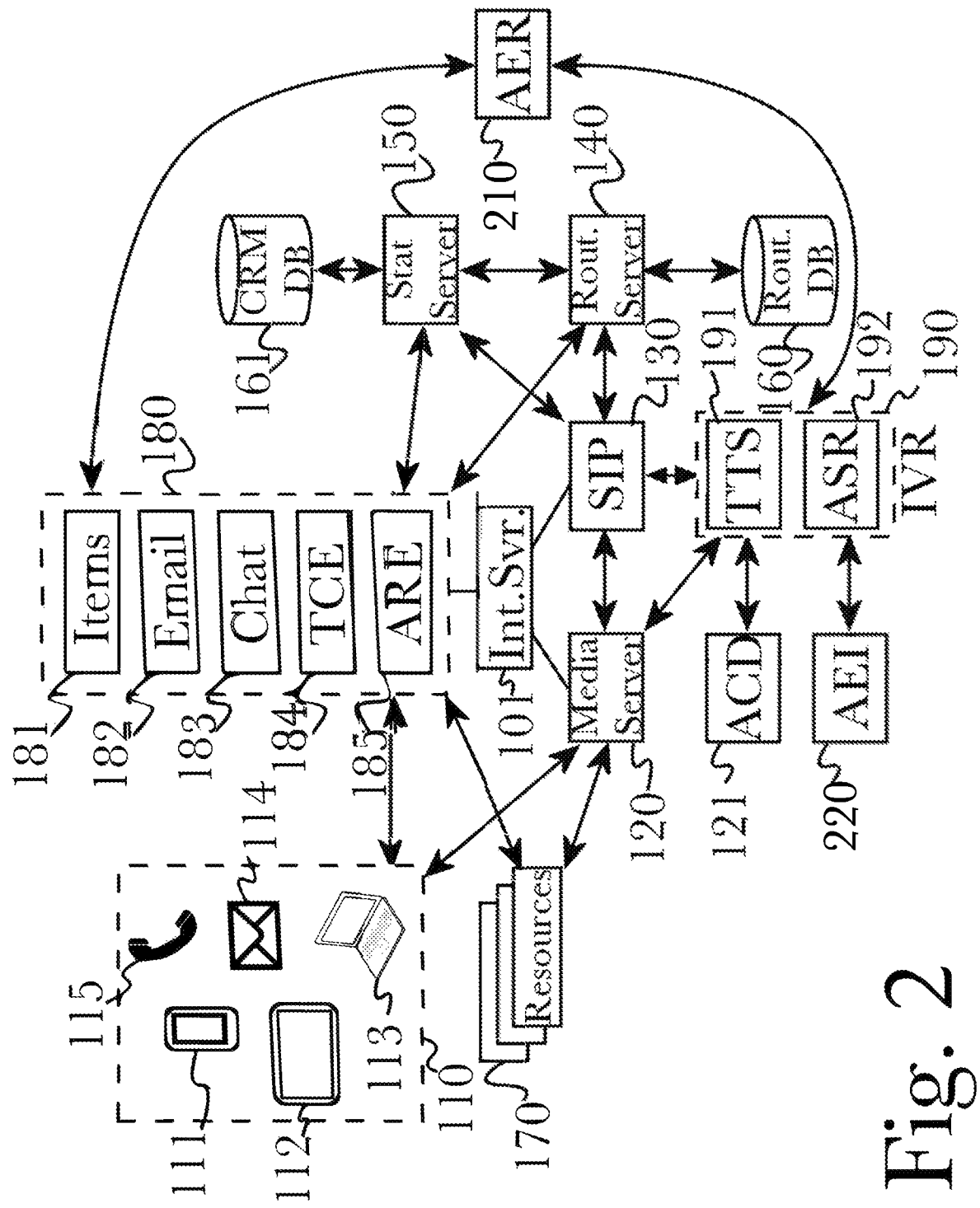
FIG. 2 is a block diagram of an exemplary system architecture for using conversational similarity for dimension reduction in deep analytics, according to an aspect.

FIG. 2 is a block diagram of an exemplary system architecture for using conversational similarity for dimension reduction in deep analytics, according to one aspect. According to the aspect, an automated emotion engine configured to operate in a generative output mode as an automated emotion injection (AEI) engine 220 may be used to produce an audio waveform from an input data set from a text-to-speech (TTS) engine 191 using dilated causal convolution. According to another aspect, an automated emotion engine configured to operate in a discriminative output mode as an automated emotion recognition (AER) engine 210 may be used to detect and recognize emotion content in existing audio, receiving emotion-laden audio as input to recognize emotion characteristics in the audio. This may then be used to determine appropriate emotions based on passages of text (such as a text-to-speech transcript), or to enhance selection of emotion for use in audio output, as well as to refine the specific characteristics of any particular emotional state to more realistically emulate that emotion during audio generation.

TTS engine 191 may produce audio from text-based scripts or generated sections of text as they are produced as output by an AEI 220, and generated speech may comprise a wide variety of linguistic and phonetic features such as syllables or phonemes and contextual information such as word usage or variations (for example, verb conjugations or noun declensions). Additionally, emotional detail may be transcribed into text and used to encode natural emotional content of human speech, such as inflection and cadence changes based on a speaker's attitude, or to encode variations based on interactions between a speaker and audience (for example, a speaker may speak with different emotion depending on the age or other factors in their audience). This emotional content may be provided along with a raw audio waveform to an AEI 220 that may associate emotional attributes with data points within the generated raw audio waveform, matching emotion to data points in the audio waveform to mark emotion-driven speech characteristics (such as changes in intonation or word choice, for example). Additionally, the text-based emotional content identifiers may be provided to a dilated convolutional artificial neural network (DCANN) learning model as input variables to enhance audio generation by conditioning the learning model with the emotional content as a new input variable. This emotion-enhanced speech audio may then be used in future raw audio generation by the AEI 220 as additional input data in future convolutional generation, enhancing all future raw audio waveforms in an autoregressive neural learning model. This technique associates raw audio data with text markers identifying emotional content, producing a mixed-output speech synthesis that combines the natural audio properties possible using raw audio generation and the enhanced quality of incorporating emotional variables into the generation of audio waveforms, producing even more natural-sounding synthesized speech audio.

Figure 3:
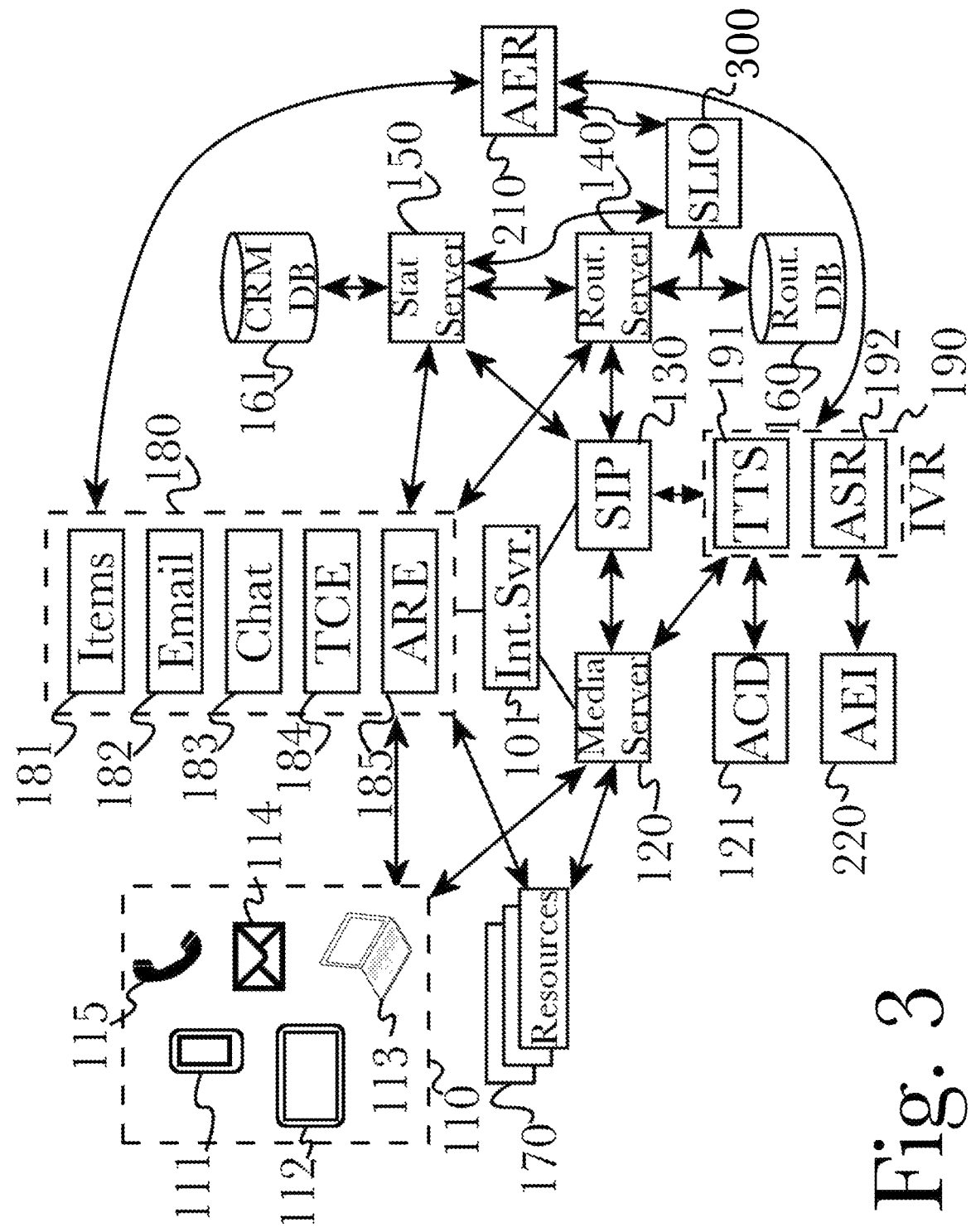
FIG. 3 is a block diagram illustrating an exemplary system architecture for a contact center utilizing a self-learning interaction optimizer (SLIO)

FIG. 3 is a block diagram illustrating an exemplary system architecture for a contact center utilizing a self-learning interaction optimizer (SLIO) 300 comprising a reinforcement learning server 310 and an optimization server 320 (both shown below in FIG. 4), according to one aspect. The optimization server 320, may communicate with an AER engine 210, as well as the reinforcement learning server 310, in order to manage and maintain models for operations and control of routing functions and other similar processes associated with connecting resources 170 to customers 110 in an optimized and efficient manner, such as increasing efficiencies by decreasing wait times or assigning tasks to available resources. The reinforcement learning server 310 may also communicate with a plurality of contact center components in order to access historical and real-time data for incorporation into the design and retraining of models which are then applied by the optimization server 320 to assign tasks to a plurality of contact center components to achieve a desired goal or outcome. The reinforcement learning server 310 and the optimization server 320 work together and in circular and iterative approaches to arrive at decisions, implement decisions as actions, and learn from results of actions which may be incorporated into future models. Collectively, SLIO 300 along with reinforcement learning server 310 and the optimization server 320 comprises a plurality of contact center components adapted to handle interactions of one or more specific channel, be it text channels 180, or multimedia channels 120, resources 170, or customers 110.

Figure 4:
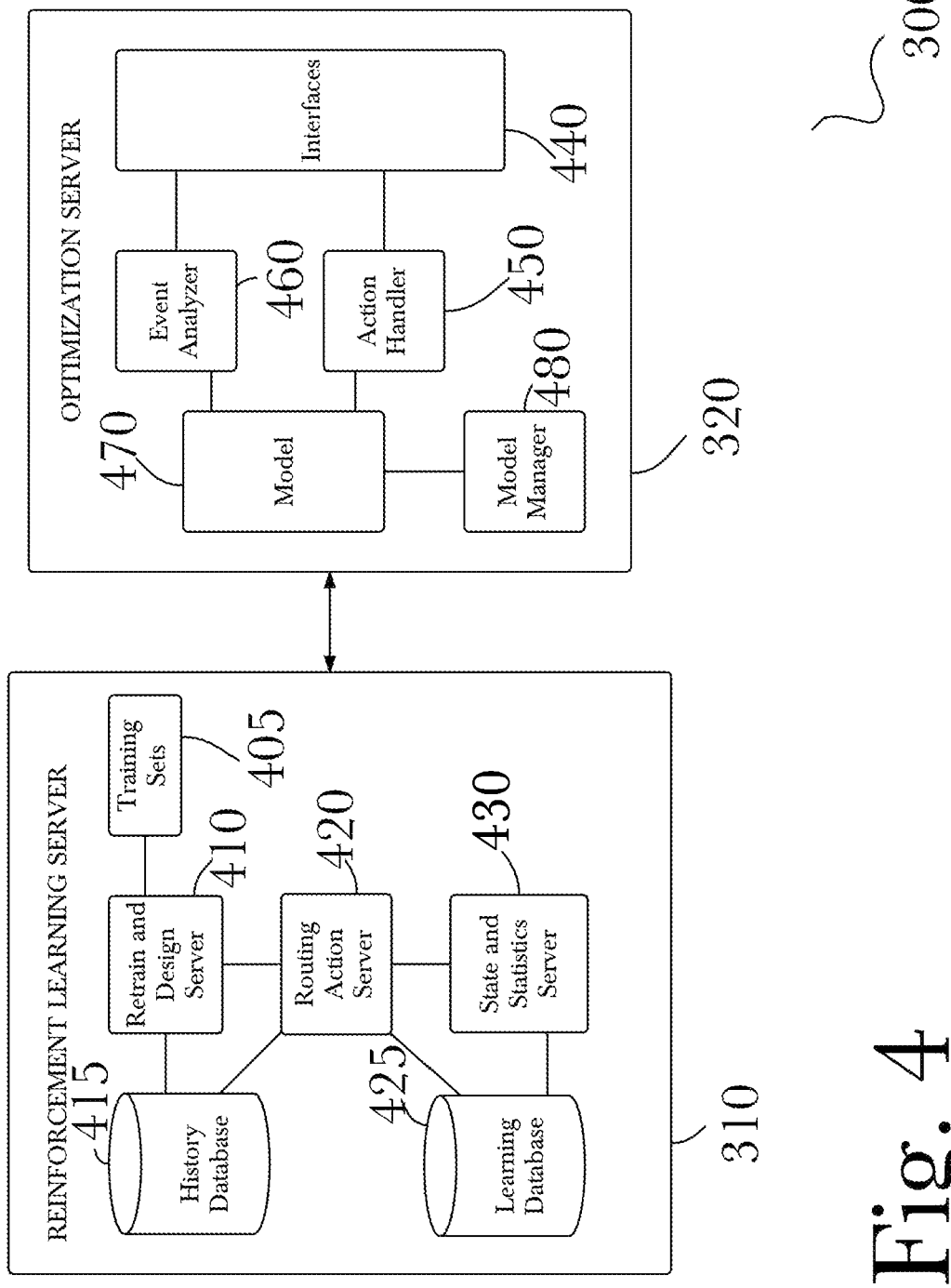
FIG. 4 is a block diagram illustrating an expanded view of an exemplary system architecture for using conversational similarity for dimension reduction in deep analytics, according to an aspect.

FIG. 4 is a block diagram illustrating an expanded view of an exemplary system architecture for a SLIO 300, that uses a reinforcement learning server 310, comprising a retrain and design server 410, a history database 415, training sets 405, a routing and action server 420, a learning database 425, and a state and statistics server 430; and an optimization server 320, comprising a Markov model 470, a model manager 480, an event handler 460, an action handler 450, and interfaces 440, according to a one aspect. Training may also be performed in a live context in some arrangements or use cases, for example wherein the retrain and design server may receive training data in a stream rather than from a data store (for example, receiving data as it is generated).

The state and statistics server 430, is responsible for representing and tracking current, real-time states, with a subsystem dedicated to pure Markov model representations of state that are efficiently stored in memory as sparse arrays and is capable of performing large scale and high speed matrix operations, optionally using specialized processors such as computation coprocessors such as Intel XEON PHI™ or graphics processing units (GPUs) such as NVidia TESLA™ instead of CPUs 41. Markov states include all information to be used, available within reinforcement learning system 300. Any aggregate counts or historical information is stored as a specific state for this purpose, in the learning database 425, and in the history database 415, respectively. In this way, a Markov assumption is not restrictive, and any process computed with the reinforcement learning server 310, and the optimization server 320, may be represented as a Markov process, within SLIO 300.

Reinforcement learning follows a productive process, training a model 470, and when the model 470 is ready, run it through subsets of training sets 405 to simulate real-time events. States are learned by reviewing history from the history database 415. Some examples of states include dialing, ringing, on a call, standby, ready, on a break, etc. Once the model 470 has been tested, it is set into motion in live action, and it controls a routing and action server 420 which then works to record more history to store in the history database 415, creates training sets 405, and reapply the model 470 based on more data, learning from more data. Once live, an optimization server 320 is engaged to control actions. Components of SLIO 300 work in "black-box" scenarios, as stand-alone units that only interface with established components, with no realization that other components exist in the system. Within the optimization server 320 an action handler 450 may act as a pacing manager, in communication with contact center systems via interfaces 440. The action handler 450 may also concern itself with dialing and giving orders to hardware to dial, receive status reports, and translate dialing results, such as connection, transfer, hang-up, etc. The action handler 450 dictates actions to the SLIO 300. The model 470 is comprised of a set of algorithms, but the action handler 450 uses the model 470 to decide and determine optimal movements and actions, which are then put into action, and the optimization server 320 learns from actions taken in real-time and incorporates observations and results to determine a further optimal actions. The event analyzer 460 receives events from the state and statistics server 430, or the statistics server 150, or any other contact center components, and then receives events as states, interprets events (states) in terms of the model 470, then decides what optimal actions to take and communicates with the action handler 450 which then decides how to implement a chosen action, and sends it via interface 440 out to any of the server components, such as statistics server 150, routing server 140, and so forth. The event analyzer 460 receives events, interprets events in accordance with the model 470, and based on results, actions are determined to be executed. An action is a directive to do something. Actions are handled by the action handler 450. An event may be thought of as a recording that "something has been done", and may include (for example, and not limited to) actions or state transitions. Actions cause transitions between states, and at any given state there are a plurality of possible actions each with new transition probabilities and rewards. The model manager 480 maintains the model 470 while inputs are being received. Once put into action, the reinforcement learning module 400 is learning as time advances. Any event, or state, being introduced passes through the reinforcement learning server 310 and any event, or state, being acted upon by the optimization server 320 passes back through the reinforcement learning server 310. Following this logic, the reinforcement learning module 300 sees what is happening in a current state as well as records respective results of actions taken.

The optimization server 320 carries out instructions from the model 470 by analyzing events with the event analyzer 460, and sending out optimal actions to be executed by the action handler 450 based on those events. The reinforcement learning server 310, during runtime, may be receiving a plurality of events, and action directives, and interpreting them, and adjusting new actions as time advances. The model manager 480 receives increments from the model 470, and from the reinforcement learning server 310, and dynamically updates the model 470 that is being used. Model manager 480 maintains a version of what is the current model 470, as well as have the option to change the model 470 each time an incremental dataset is received, which may even mean changing the model every few minutes, or even seconds, or after a prescribed quantity of changes are received.

Using a SLIO 300 with the emotion recognition and injection capabilities provided through the use of DCANNs, it becomes possible to automatically recognize emotion in interactions, and then select an optimum action or path based on the recognized emotions and curation of the emotion injected into responses presented during the interaction in order to optimize the expectation value of the outcome.

Figure 14:
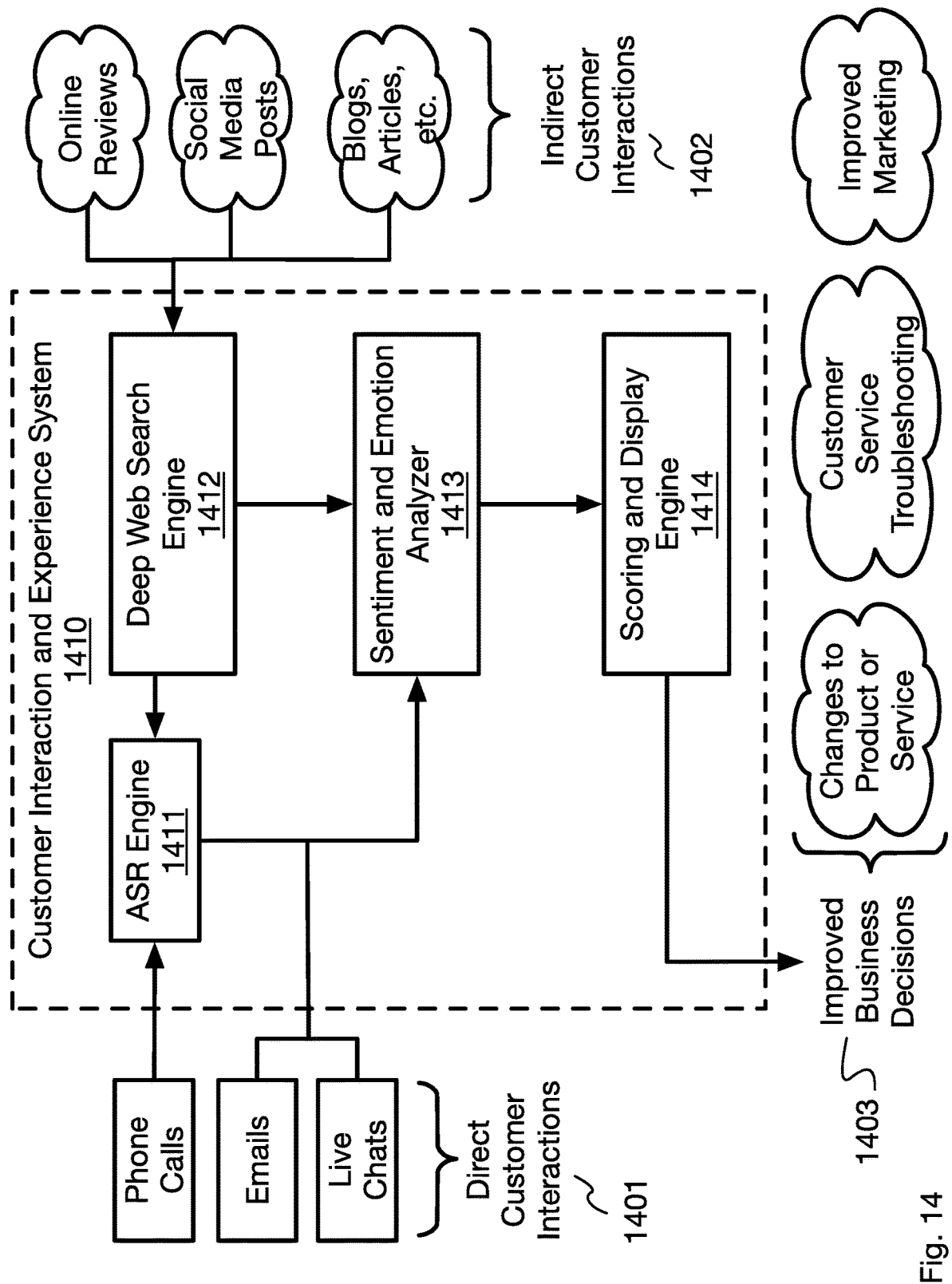
FIG. 14 is a block diagram illustrating an exemplary system architecture for a customer interaction and experience system using sentiment and emotion analysis.

FIG. 14 is a block diagram illustrating an exemplary customer interaction and experience system 1410 which automatically gathers direct and indirect customer communications about products and services, converts them to text where necessary, and analyzes the communications for sentiment and emotional content, and scores and displays the information in a manner conducive to making improved business decisions 1403 based on the customer sentiment and emotion, such as making changes to products or services, troubleshooting customer service interactions, and better marketing. In this embodiment, the system consists of a deep web search engine 1412, an automated speech recognition engine 1411, a sentiment and emotion analyzer 1413, and a scoring and display engine 1414. The deep web search engine 1412 automatically searches the internet for indirect customer communications 1402 related to products and services of interest to the business. Such content would be drawn from a variety of sources including online reviews, social media posts, blogs, articles, and may consist of text, audio, or video. Indirect customer communications 1402 containing text are sent directly to the sentiment and emotion analyzer 1413. Indirect customer communications 1402 that contain audio data (e.g., audio product reviews and video product reviews) are sent to the automated speech recognition engine 1411. Direct customer communications 1401 with the business in text form (e.g., email and live chats) are sent directly to the sentiment and emotion analyzer 1413. Direct customer communications 1401 with the business that contain audio data (e.g., phone calls and video conferences) are sent to the automated speech recognition engine. The automated speech recognition 1411 engine converts any audio data received into text, and forwards the text to the sentiment and emotion analyzer 1413. The sentiment and emotion analyzer 1413 analyzes the incoming text for sentiment and emotional content and forwards the analysis to the scoring and display engine 1414. The scoring and display engine 1414 cumulatively assigns scores for sentiment and emotion to products and services of interest to the business based on the analysis from the sentiment and emotion analyzer 1413, and displays the resulting information in textual, tabular, or graphical form for use by decision-makers at the business.

Figure 15:
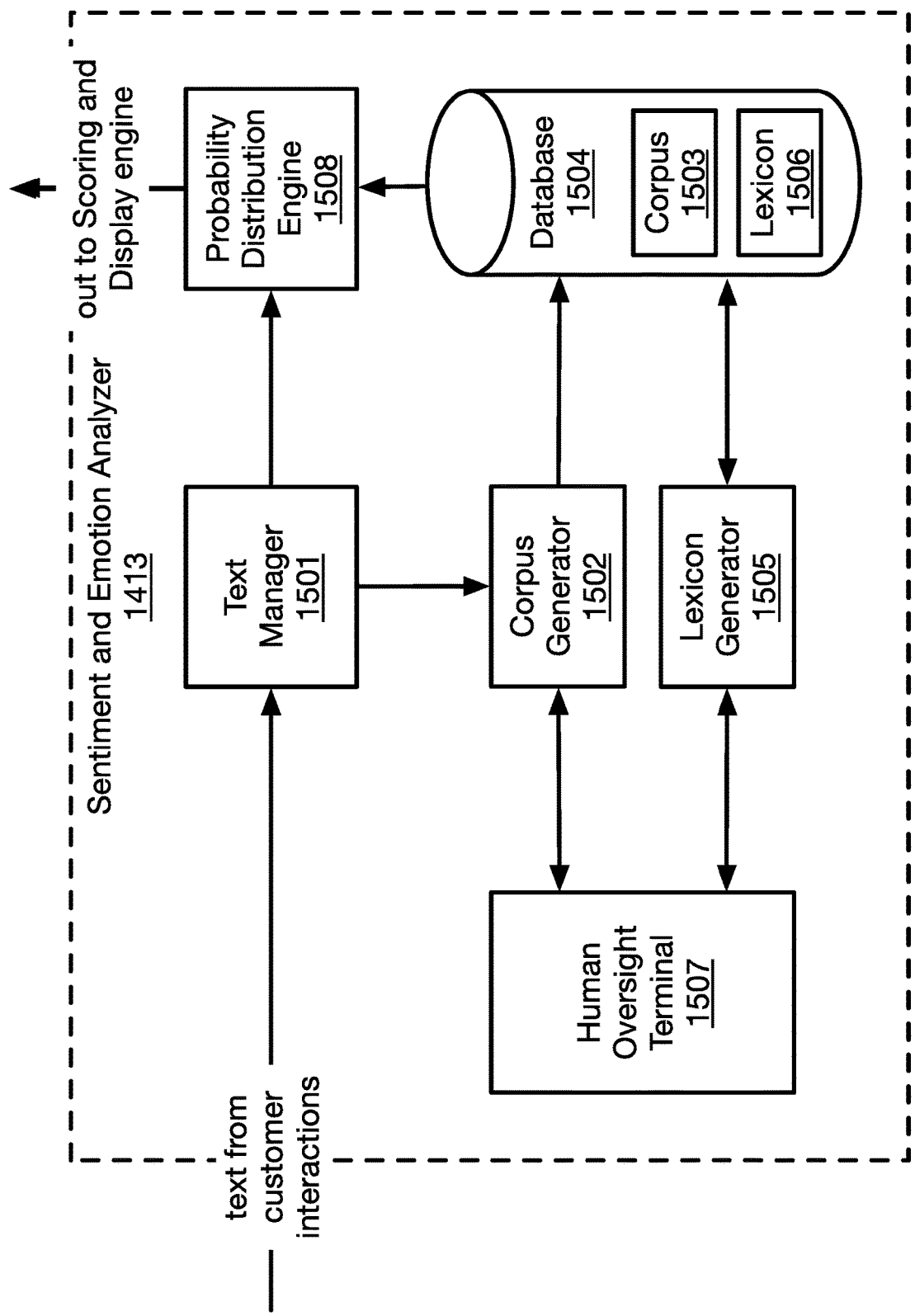
FIG. 15 is a block diagram illustrating an exemplary system architecture for an aspect of a preferred embodiment, the sentiment and emotion analyzer.

FIG. 15 is a block diagram illustrating an exemplary system architecture for an aspect of a preferred embodiment, the sentiment and emotion analyzer 1413. The sentiment and emotion analyzer 1413 contains a text manager 1501, a corpus generator 1502, a corpus 1503, a database 1504, a lexicon generator 1505, a lexicon 1506, a human oversight terminal 1507, and a probability distribution engine 1508. The text manager 1501 forwards the information both to the corpus generator 1502 and probability distribution engine 1508. The corpus generator 1502 parses and organizes natural language words and phrases from current and prior text-based information it has received from the text manager 1501 and stores that information as a corpus 1503 in the database 1504. The lexicon generator 1505 accesses the corpus 1503 contained in the database 1504 and assigns vector dimensions associating words and phrases depending on their context, using label propagation machine learning algorithms. The resulting lexicon 1506 in vector form is likewise stored in the database 1504. The human oversight terminal 1507 allows for supervision and correction of the assignment of vector information generated by the lexicon generator 1505 to ensure accuracy and to train the machine learning algorithms. Using the corpus 1503 and lexicon 1506 contained in the database 1504, a probability distribution engine 1508 assigns probabilities of the sentiment and emotions being expressed in the current text-based information it has received from the text manager 1501, and outputs the likely sentiment and emotional content of the current text-based information to the scoring and display engine 1414.

Figure 16:
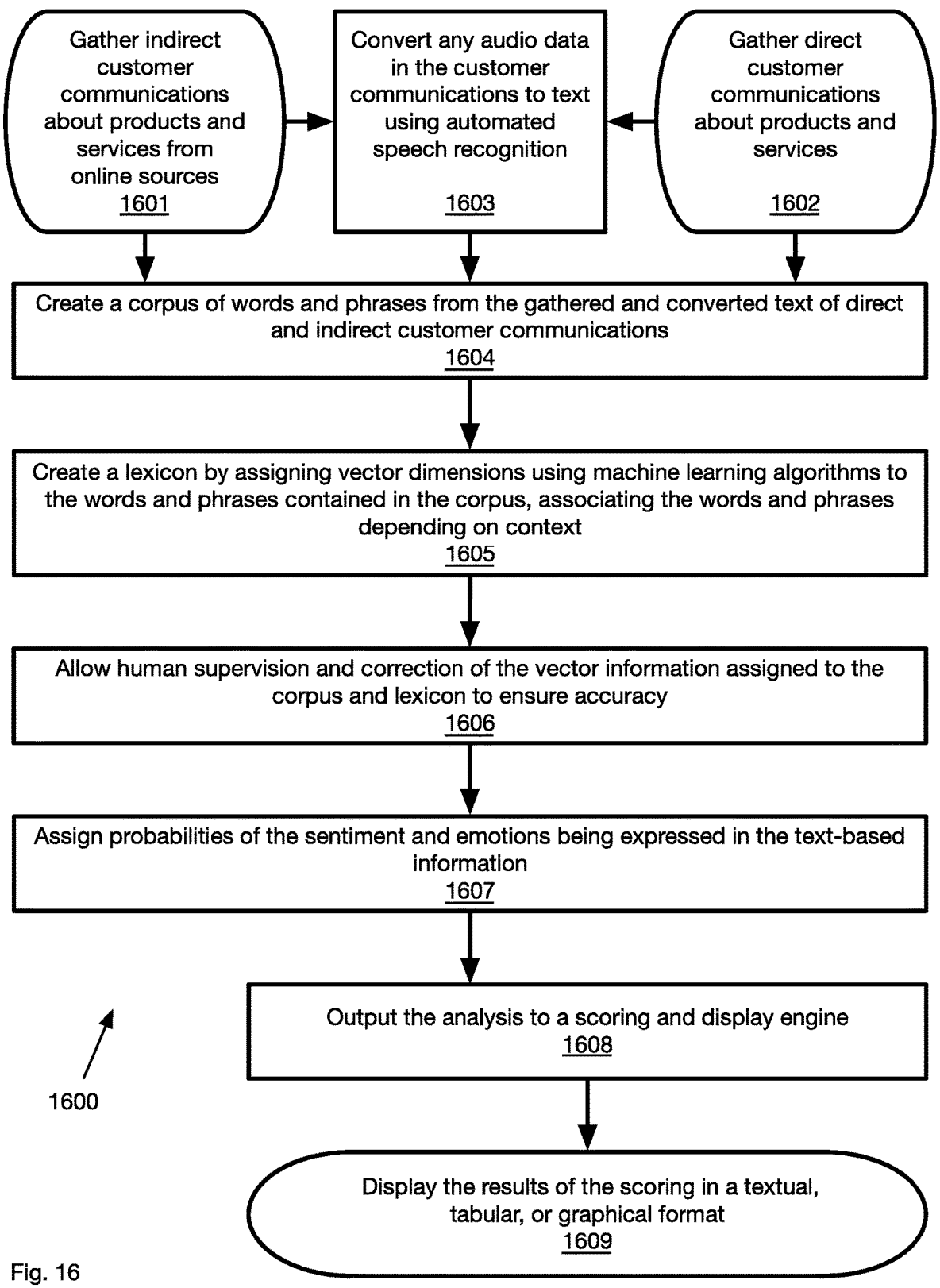
FIG. 16 is a flow diagram illustrating and exemplary method for a customer interaction and experience enhancement using sentiment and emotion analysis.

FIG. 16 is a flow diagram illustrating an exemplary method for a customer interaction and experience system using sentiment and emotion analysis 1600, comprising the steps of: (a) gathering indirect customer communications about products and services from online sources 1601; (b) gathering direct customer communications about products and services 1602; (c) converting any audio data in the customer communications to text using automated speech recognition 1603; (d) creating a corpus of words and phrases from the gathered and converted text of direct and indirect customer communications 1604; (e) creating a lexicon by assigning vector dimensions using machine learning algorithms to the words and phrases contained in the corpus, associating the words and phrases depending on context 1605; (f) allowing human supervision and correction of the vector information assigned to the corpus and lexicon to ensure accuracy 1606; (g) assigning probabilities of the sentiment and emotions being expressed in the text-based information 1607; (h) outputting the analysis to a scoring and display engine 1608; and (i) displaying the results of the scoring in textual, tabular, or graphical format 1609.

Detailed Description of Preferred Aspects

Figure 13:
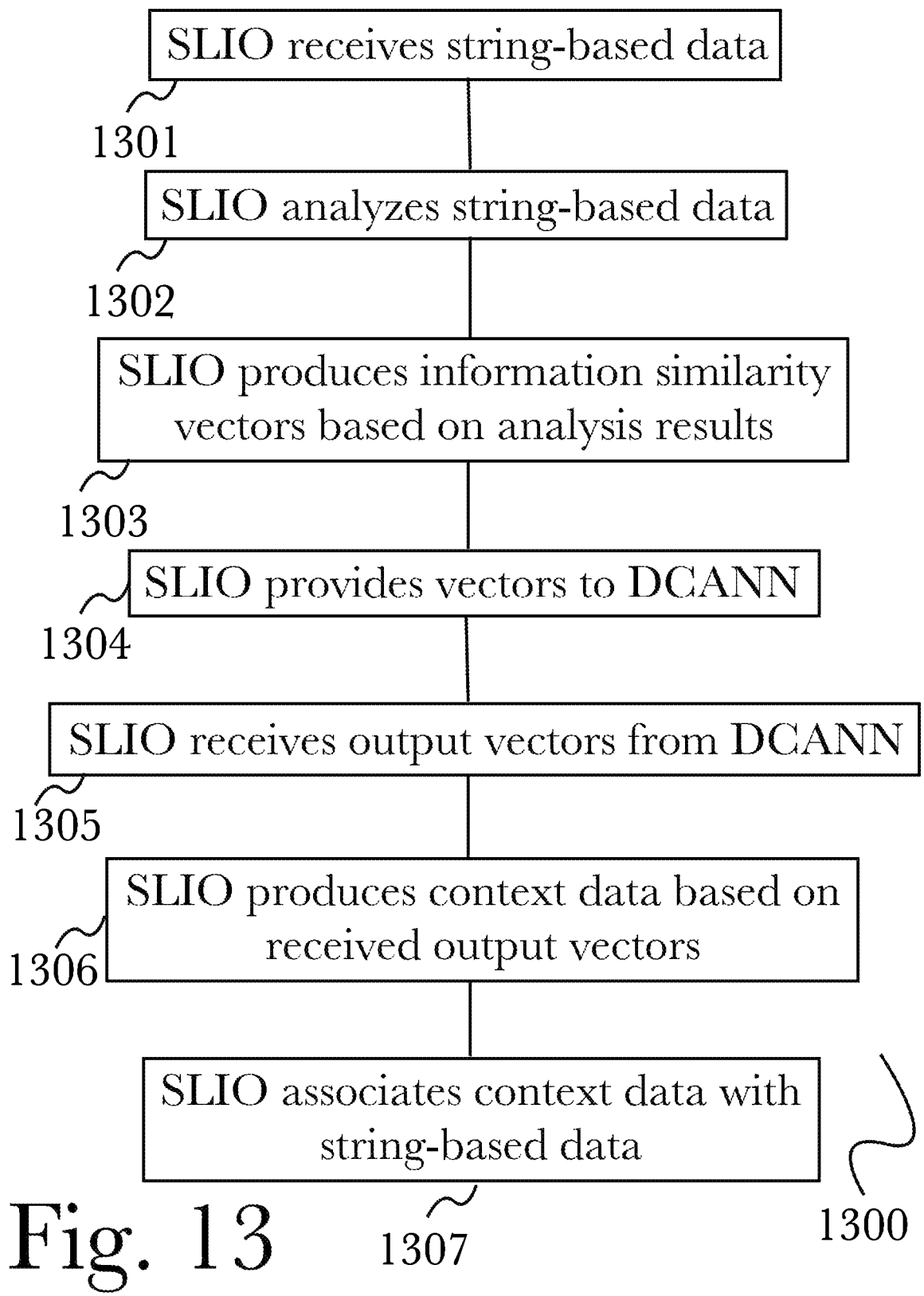
FIG. 13 is a flow diagram illustrating an exemplary method for using conversational similarity for dimension reduction in deep analytics, according to an aspect.

FIG. 13 is a flow diagram illustrating an exemplary method 1300 for using conversational similarity for dimension reduction in deep analytics, according to an aspect. According to the aspect, in an initial step 1301 a self-learning interaction optimizer (SLIO) 300 may receive string-based data from a contact center, such as (for example) interaction information comprising conversation dialog or interaction between a caller and an automated system such as an interactive voice response (IVR) prompt. In a next step 1302, SLIO 300 may analyze at least a portion of the string-based data, producing 1303 a plurality of information similarity vectors based at least in part on the analysis (as described below, referring to FIGS. 5-8). These similarity vectors may then be provided 1304 to a DCANN for use as input, and output vectors may be received 1305 from the DCANN. These output vectors may then be used to produce context information 1306 that may then be associated with the original string-based data 1307 corresponding to the input vectors used.

FIG. 5 is an illustration of a topical similarity matrix 500, according to an aspect. According to the aspect, document occurrence vectors may be used on a set of short documents 510*a-d* to model occurrences of specified topics 520*a-d* within documents, to produce a topical similarity matrix 500 modeling information similarity between documents based on their respective occurrences of the topics, identifying when two documents may be similar 531 or dissimilar 532 based on their topical content. According to the aspect, various high-dimensional vector spaces may be used to compute conversational distance/similarity. For example, a vector space model may be used to represent an item (e.g., a word or a phoneme) as a vector of numbers. According to one aspect, each vector element may correspond to an occurrence count in a particular document (conversations and fragments of conversations may be considered "documents", where document means a sequence of text objects representing transcribed spoken text or written text). According to another aspect, each element may correspond to neighboring word context (other word+/−n distance). According to still another aspect, each element may correspond to character trigrams within the word. Using high-dimensional vector spaces makes it possible to use various methods to compute distances. According to still another aspect, comparing two vectors (using, for example, cosine similarity) may estimate how similar they are.

FIG. 6 is an illustration of a matrix 600 showing typical similarity, according to an aspect. According to the aspect, using word context vectors gives a matrix showing typical similarity. Given a set of four exemplary short documents, "Seattle Seahawks, jerseys", "Seattle Seahawks, highlights", "Denver Broncos, jerseys", and "Denver Broncos, highlights", word similarity and proximity may be used to form word context vectors that describe occurrences of specific words 620*a-d* within specific proximity to each other. According to the aspect, similarity criteria A-G 610*a-n* correspond to the similarity criteria ("Seattle", −1), ("Seahawks", +1), ("Denver", −1), ("Broncos", +1), ("jerseys", +1), ("jerseys", +2), ("highlights", +1), and ("highlights", +2), respectively. It can be seen that the similarity vectors describe the occurrences of each word within the specified proximity according to the similarity criteria, for example two occurrences of the word "Seahawks" one position after the word "Seattle", in both short documents "Seattle Seahawks, jerseys" and "Seattle Seahawks, highlights". This may be used to identify typical similarity 621 between the words or phrases themselves, for example (as illustrated) identifying that the words "Seattle" and "Denver" are similar in type (as they each refer to a city). This matrix 600 identifies similarity between words or phrases based on their type, as well as identifying the number of specified occurrences of related words within the specified proximity, which may be used to further enhance similarity recognition with a "similarity strength", for example to identify that two words may be "more similar" as they occur more often, or in greater proximity, compared to another set of related words.

FIG. 7 is an illustration of the use of character trigrams 710*a-n* to provide a notion of information distance similar to string edit-distance measurements, according to an aspect. According to the aspect, information distance between two words, phrases, topics, or other string-based features 720*a-b* may be determined using character trigrams, or strings with a length of three characters (according to various particular use-cases or arrangements, strings of different length may be used, however strings with a length of three characters are effective and are described herein for clarity). By checking strings 720*a-b* for occurrences of trigrams 710*a-n*, the information distance between strings 720*a-b* can be described as the difference in the count of occurrences of trigrams 710*a-n*, describing the similarity between the strings 720*a-b* in terms of shared linguistics features.

Figure 8:
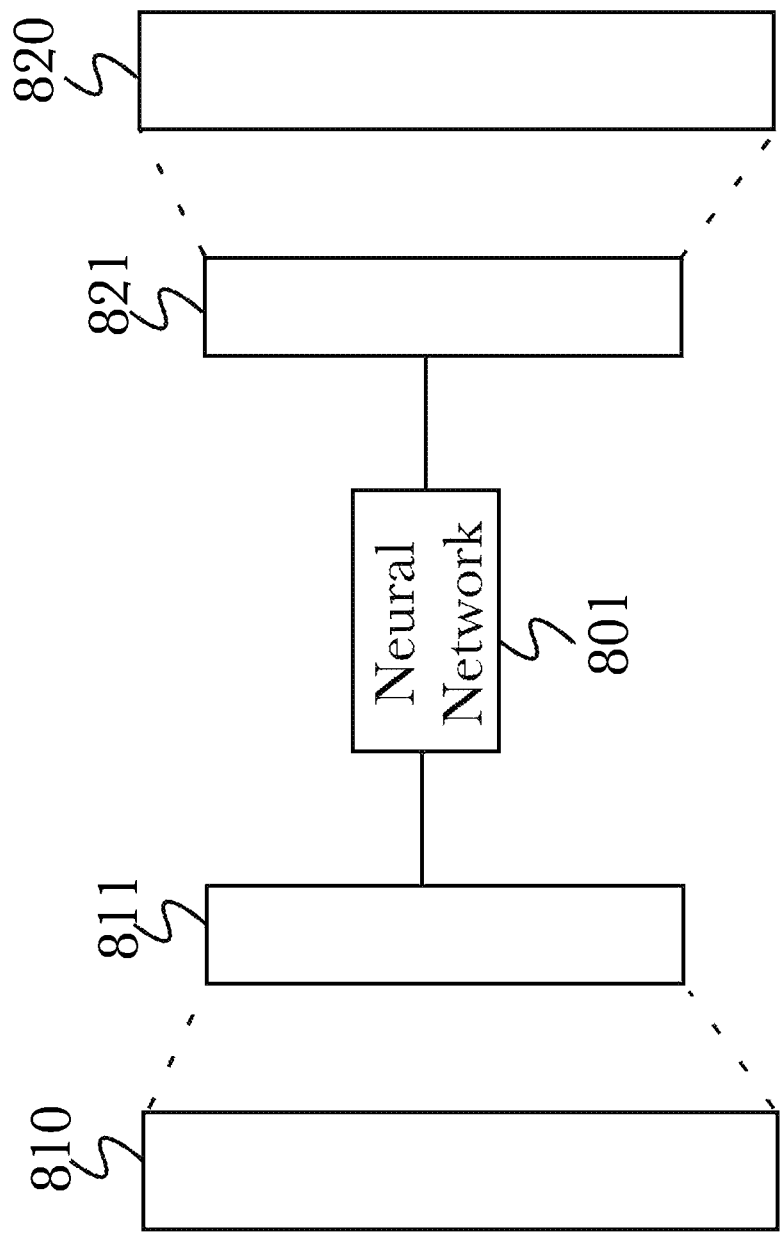
FIG. 8 is an illustration of a neural network with a bottleneck, with word and context as input and output respectively, according to an aspect.

FIG. 8 is an illustration of a neural network 801 with a bottleneck, with word and context as input 810 and output 820 respectively, according to an aspect. According to the aspect, lower-dimensional dense vectors may be generated using various techniques to allow assessment of conversational similarity (as described previously, referring to FIGS. 5-7). Some techniques include, but are not limited to, matrix factoring techniques such as Latent Dirichlet Allocation (LDA), and GloVe (which uses word-neighboring word relations); neural networks; word2vec, doc2vec, sent2vec and deep semantic similarity models (DSSM). According to the aspect, a DSSM may be used to train on multi-word short text. As with word embeddings, a DSSM may be trained to capture either typical or topical relationships, as described previously (referring to FIGS. 5-6). Words 810 are thereby used to produce vectors 811 using the techniques described previously, which are processed by a neural network 801 such as a DCANN, which processes the vectorized inputs to produce output vectors 821 that may then be expanded to form context 820 for the input words 810.

According to various aspects, when an agent (i.e., a contact center agent) interacts with a customer (typically a caller into a contact center, or a customer who has been called by the contact center), a series of measurements of semantic or other distance between the language of the agent and the language of the customer is made, and a time series comprised of these differences is obtained. Interactions may be via text (for example, using web chat or email) or via spoken voice (for example, during a live phone call or similar IP-based synchronous audio session). Typically, agents who use language (written or spoken) similar to that of the customer will interact in a more beneficial manner with the customer. "Distance" is used here as a term analogous to "conversational similarity", and distance measurements may be made based on semantic distance, stylistic distance, emotional distance, acoustic difference (for example, differences in tonal range and prosody/rhythm), or other similar distance measures appropriate for measuring distance between spoken and/or written text fragments.

It may be that agents with good (i.e., short) "conversation distances" or highly similar conversational styles/attributes, relative to a given customer, tend to be more effective at selling (where persuasion and "good feelings" may be important), whereas only certain types of high similarity scores (low distances) may indicate suitability for customer service-focused interactions (for example, high match in empathy aspects, or in technical speech sophistication, may be important). Another aspect involves looking at the distance between topic top words (or other abstracted summaries and embeddings), with or without weighting. For example, agents may be grouped according to semantic aspects, and calls may be routed accordingly, in some aspects.

Another aspect believed to have great potential is the use of time aspects of conversational similarity measurements. For instance, if there are marked changes during the course of an interaction in conversational distance between an agent and a customer, it could indicate one of several situations that may have decision-making importance: a call may be "going sideways" and require an adjustment; a conflict between agent and customer may be indicated; or an agent may be moving from "qualify" to "close" in a sales call. Each of these—and many more—situations may typically require or suggest some operational response in the contact center (for instance, initiating call recording or stopping it; providing coaching to an agent; escalating a call; adding a supervisor in silent mode; or even transferring a call to an agent better situated to handle the new situation. Moreover, measurements of conversational distance may be made between two or more agents, or between two or more customers. According to an aspect, clustering of people (agents and/or customers) based on conversational similarity distances may be made to provide novel and useful groupings of agents (which could be used for training, scheduling, or routing) and customers (which may be used for tailoring scripts, routing, and so forth). It should be appreciated that many other techniques may be used, according to various aspects or use-cases, to measure similarity between strings.

According to an aspect, conversational distance between speakers, either based on history or based on intracall measurements, may be used as an input feature for the prediction of call outcome, service resolution, and the like. In this way, supervised learning may be conducted during a call/conversation, and optimal choices of next actions to take may be determined, for example by a dilated convolutional artificial neural network or group of the same. As mentioned above, monitoring of distance over time may yield valuable information and actionable insights. For example, it may be determined that conversational distance reliably changes just prior to a sale (or just prior to a call escalation); such clues may be used to promote good results and mitigate emerging likelihood of bad results in real time. When reinforcement learning is used, such measurements over time may change the "next best action", for example by suggesting a FUD (fear, uncertainty, and doubt) list of prompts when a competitor's name is mentioned.

Another useful application of conversational distance measurements in real time, according to an aspect, is script adherence monitoring. When an agent's "distance to script" starts to diverge or exceeds a threshold, an alert may be generated or the agent may be prompted with one or more script prompts to guide them back to planned script actions. According to another aspect, audible alerts may be provided when a call starts to diverge from an expected or desirable path, and for example a word cloud (based on conversational distance statistics) of suggested words/phrases to improve performance at that moment may be provided to an agent (or certain suggestions may be "whispered" to the agent through the agent's headset. These last aspects may be particularly useful when newly-trained agents are handling customer interactions, as it may be expected that new agents are more likely than experience agents to get off track- and to not be aware of the fact that they have gotten off track.

According to an aspect, a system that measures conversational distances may alert an agent at the beginning of an interaction of the type of customer they are encountering (based on the customer's prior history, and the history of a plurality of other customers that demonstrated low conversational distances relative to the customer being encountered), and may provide some suggestions to the agent on how to proceed based on the customer's conversational cluster/style.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
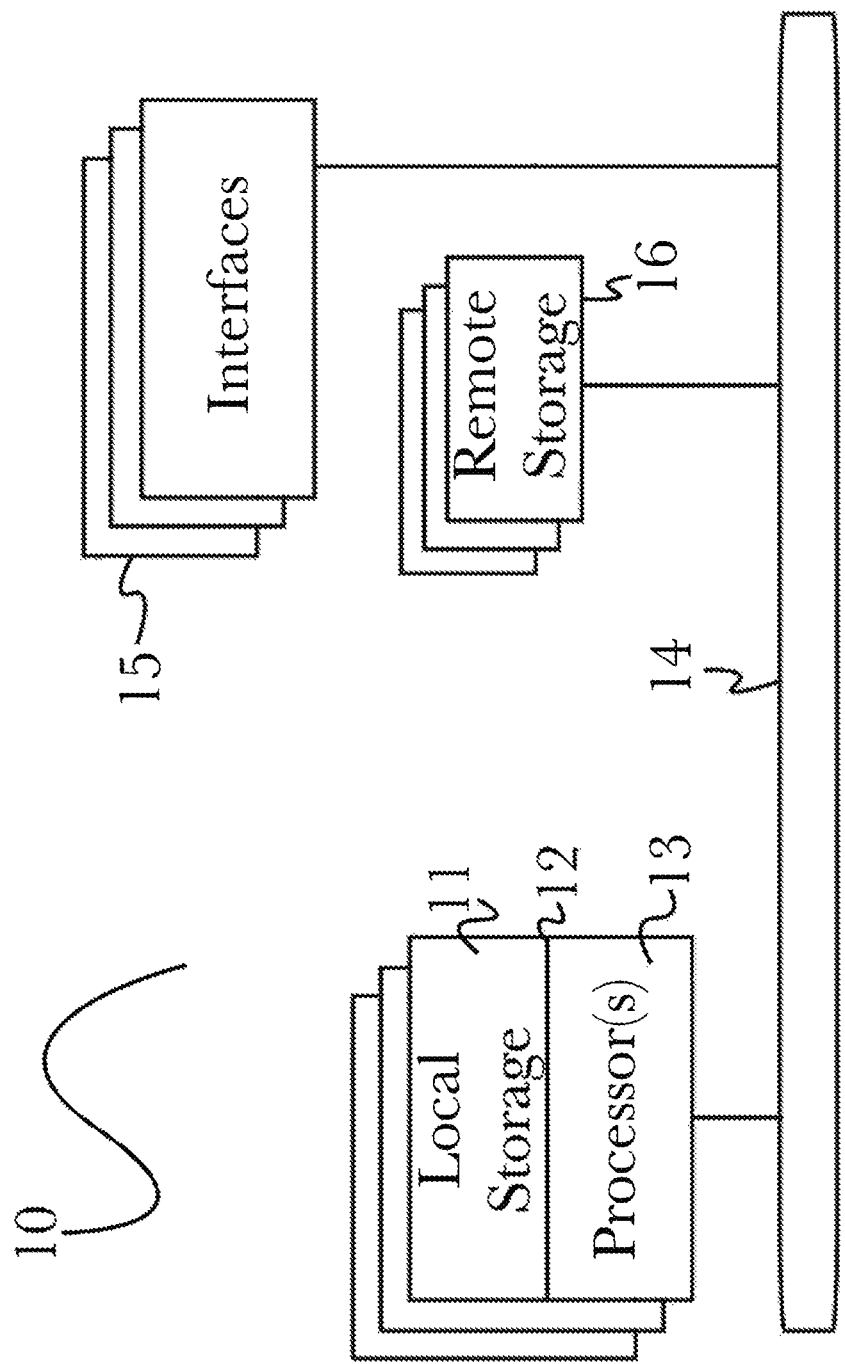
FIG. 9 is a block diagram illustrating an exemplary hardware architecture of a computing device.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of the present aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
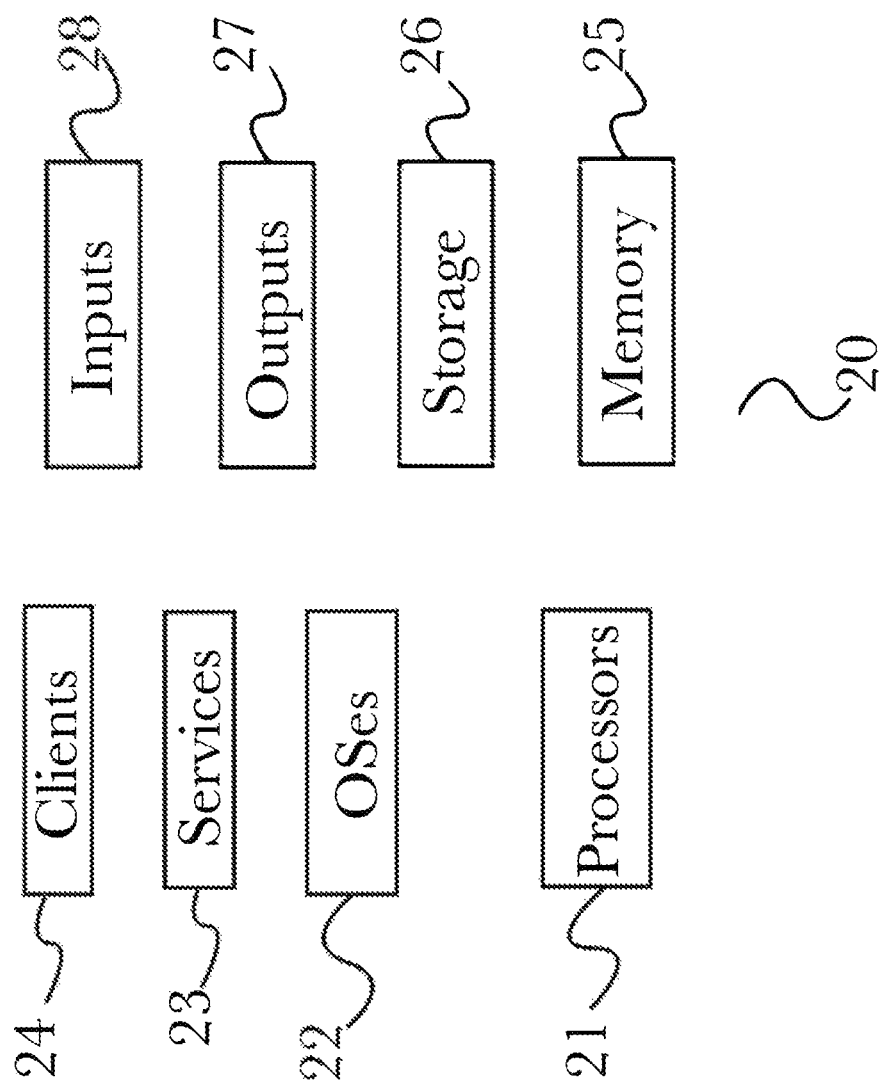
FIG. 10 is a block diagram illustrating an exemplary logical architecture for a client device.

In some aspects, systems according to the present aspect may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
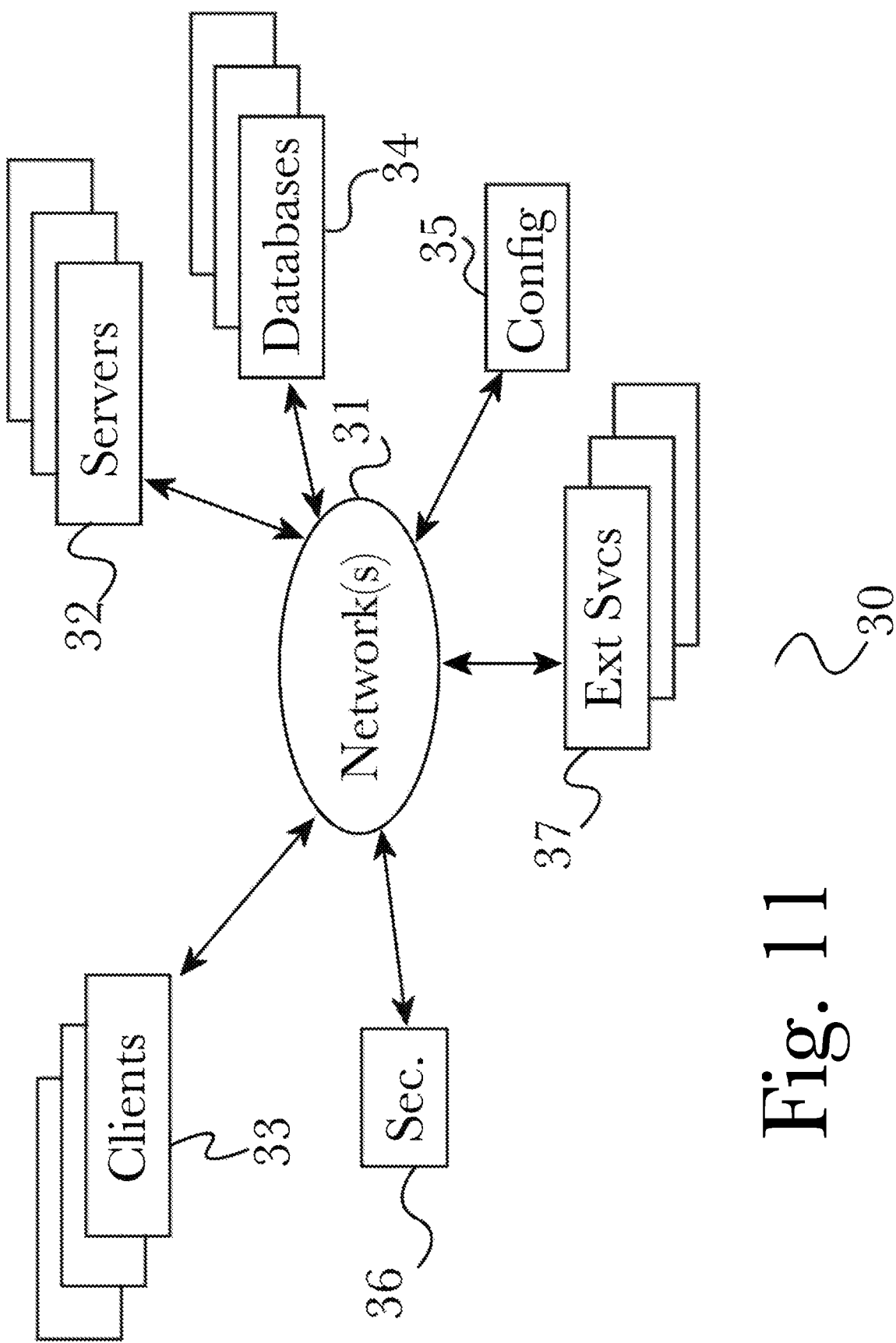
FIG. 11 is a block diagram showing an exemplary architectural arrangement of clients, servers, and external services.

In some aspects, systems of the present aspect may be implemented on a distributed computing network, such as one having any number of clients and/or servers. Referring now to FIG. 11, there is shown a block diagram depicting an exemplary architecture 30 for implementing at least a portion of a system according to an aspect on a distributed computing network. According to the aspect, any number of clients 33 may be provided. Each client 33 may run software for implementing client-side portions of the present aspect; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in an aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
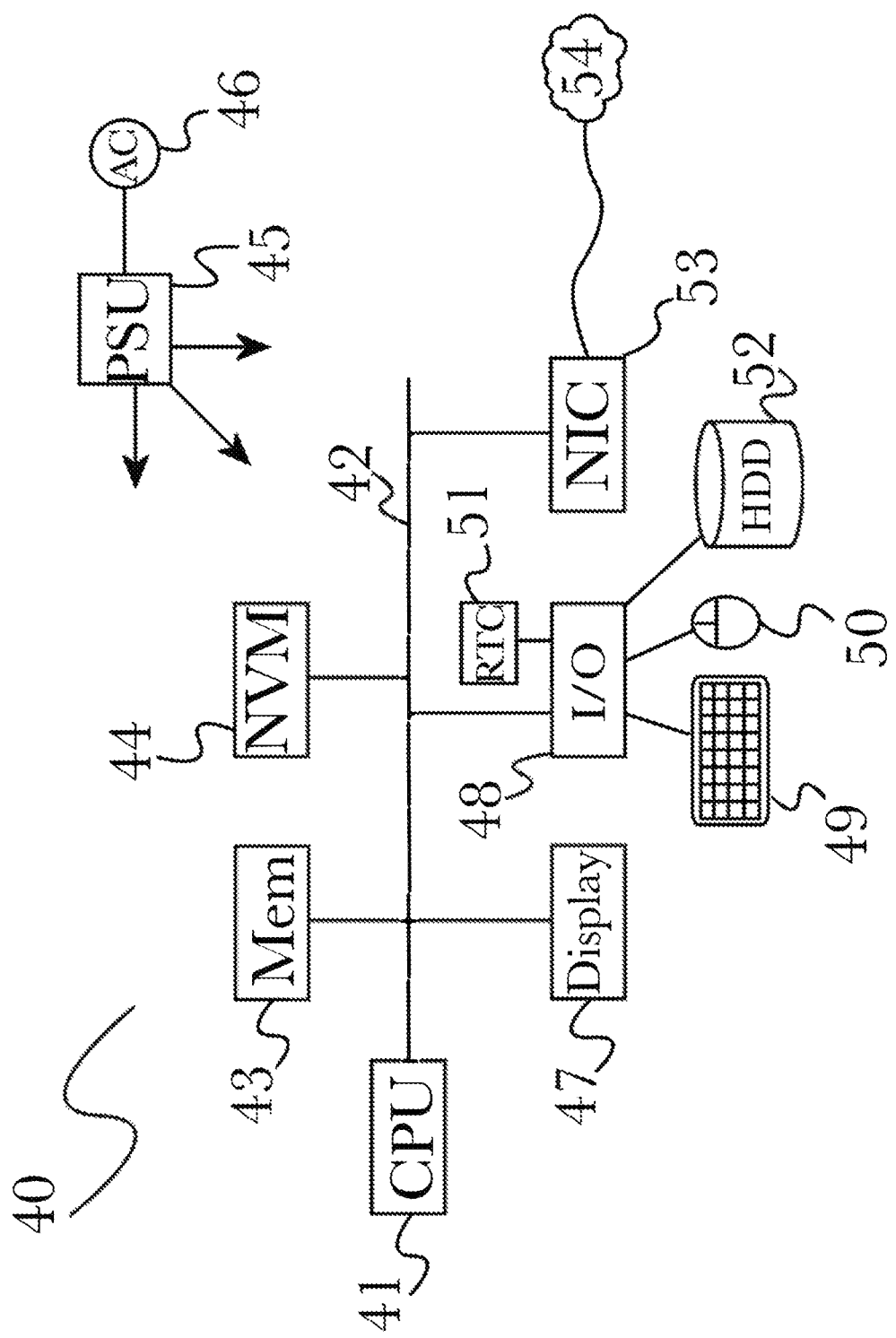
FIG. 12 is another block diagram illustrating an exemplary hardware architecture of a computing device.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of the various aspects described herein may be distributed among any number of client and/or server components. For example, various software modules may be implemented for performing various functions in connection with the aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for enhancing customer relations through automated analysis of the conversational distance in direct and indirect customer communications, comprising:
    a web search engine for gathering indirect customer communications about products and services from online sources;
    an automated speech recognition engine for converting audio to text transcriptions;
    a sentiment and emotion analyzer for:
        receiving direct and indirect customer communications, each communication being associated with a product or service and each communication comprising either text content or audio content, the text content and audio content comprising an expression of an emotion or a sentiment;
        converting any audio content to text content using the automated speech recognition engine;
        receiving text content from each of the direct and indirect customer communications;
        analyzing the received text content using a machine learning algorithm to determine a conversational distance between an agent and a customer for each of the direct and indirect customer communications, wherein:
            the conversational distance is determined at least in part by the emotion or the sentiment;
            the conversational distance for the direct customer communications is determined using the agent's interactions with the customer, and
            the conversational distance for the indirect customer communications is determined using the agent's history of interactions with other customers;
        cumulatively assigning similarity scores to the products or services associated with the direct or indirect customer communications based on the determined conversational distance; and
        generating a recommended response for the agent to each direct or indirect communication based on the assigned similarity score for that direct or indirect communication.

2. The system of claim 1 wherein the sentiment and emotion analyzer uses vector clustering to segment similar content.

3. The system of claim 1 wherein the sentiment and emotion analyzer uses linear transformation to translate between the language of product-specific or service-specific domains.

4. The system of claim 1 wherein the sentiment and emotion analyzer uses vector algebra to determine sentiment.

5. The system of claim 1 wherein the sentiment and emotion analyzer uses vector calculus to understand and predict time evolution in sentiment by calculating rates of change of vectors and time dynamics, and the predictions are applied to the cumulatively assigned similarity scores.

6. A method for enhancing customer relations through automated analysis of conversational distance in direct and indirect customer communications, comprising:
    gathering indirect customer communications from online sources using a web search engine operating on a computing device;
    receiving direct and indirect customer communications at a sentiment and emotion analyzer operating on the computing device, each communication being associated with a product or service and each communication comprising either text content or audio content the text content and audio content comprising an expression of an emotion or a sentiment;
    converting any audio content to text content using an automated speech recognition engine operating on the computing device;
    analyzing text content from each of the direct and indirect customer communications using a machine learning algorithm to determine a conversational distance between an agent and a customer for each of the direct and indirect customer communications, wherein:
        the conversational distance is determined at least in part by the emotion or the sentiment;

the conversational distance for the direct customer communications is determined using the agent's interactions with the customer, and the conversational distance for the indirect customer communications is determined using the agent's history of interactions with other customers;

cumulatively assigning similarity scores to the products or services associated with the direct or indirect customer communications based on the determined conversational distance; and generating a recommended response for the agent to each direct or indirect communication based on the assigned similarity score for that direct or indirect communication.

7. The method of claim 6 comprising the additional step of using vector clustering to segment similar content.

8. The method of claim 6 comprising the additional step of using linear transformation to translate between the language of product-specific or service-specific domains.

9. The method of claim 6 comprising the additional step of using vector algebra to determine sentiment.

10. The method of claim 6 comprising the additional step of using vector calculus to understand and predict time evolution in emotion and meaning by calculating rates of change of vectors and time dynamics, and applying the predictions to the cumulatively assigned similarity scores.

* * * * *